United States Patent

[11] 3,572,716

[72] Inventor Fred B. Bear
 Grayling, Mich.
[21] Appl. No. 778,548
[22] Filed Nov. 25, 1968
[45] Patented Mar. 30, 1971
[73] Assignee Victor Comptometer Corporation
 Chicago, Ill.

[54] HUNTING ARROW WITH DRUG DISPENSING POD
 10 Claims, 8 Drawing Figs.
[52] U.S. Cl. .................................................. 273/106.5
[51] Int. Cl. .................................................. F41b 5/04
[50] Field of Search .......................................... 273/106.5,
 106.5 (B), 106.5 (D); 128/215; 43/6; 102/92

[56] References Cited
UNITED STATES PATENTS
2,909,372  10/1959  Neri .......................... 273/106.5(B)
3,066,940  12/1962  De Lonais ................. 273/106.5(B)
3,457,921  7/1969   Waldeisen .................... 102/92X Primary Examiner—Anton O. Oechsle
Assistant Examiner—Paul E. Shapiro
Attorneys—Emory L. Groff and Emory L. Groff, Jr.

ABSTRACT: A hunting arrow including a pod readily attached to the broadhead for the automatic dispensing of a tranquilizing composition upon entry of the head into the flesh of game. Cover means normally encapsulates the composition but is displaced rearwardly by the animal flesh to expose the composition to the animal tissue to insure a quick, humane kill.

PATENTED MAR 30 1971 3,572,716
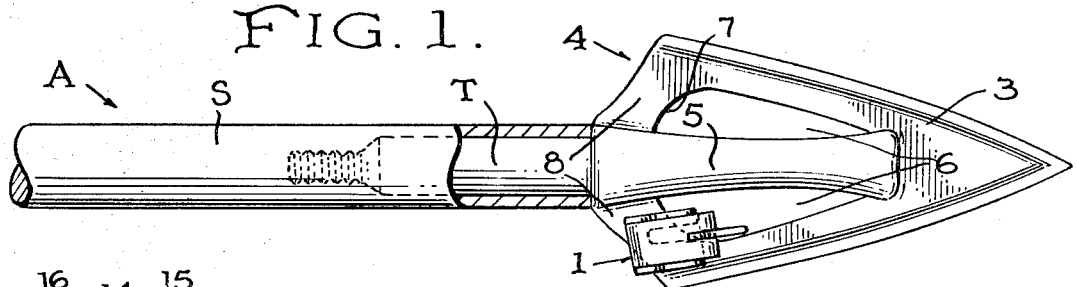
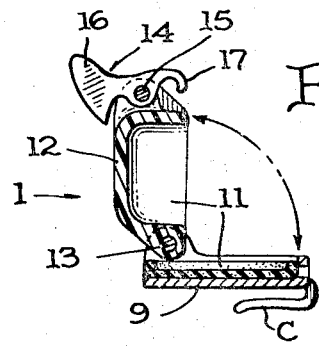
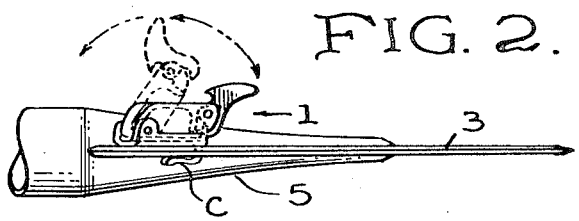
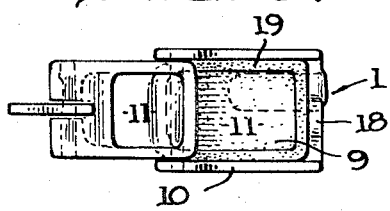
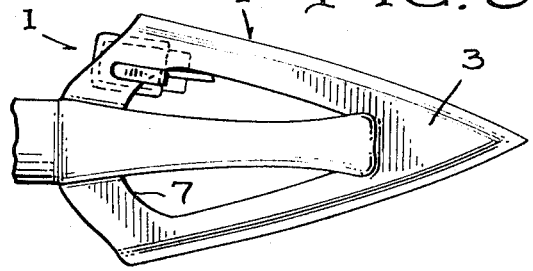
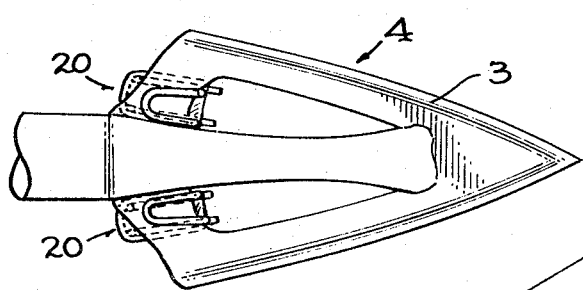
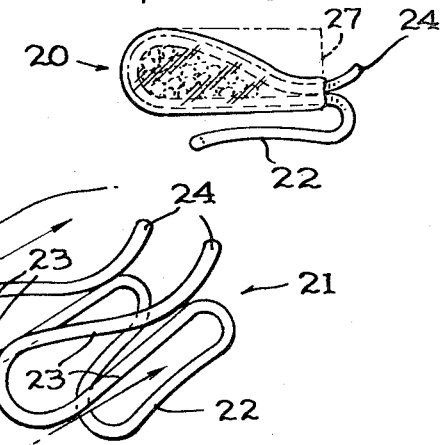
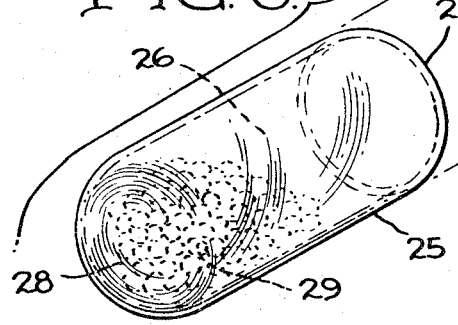
INVENTOR
FRED B. BEAR
BY Emory G. Groff Jr.
ATTORNEY

HUNTING ARROW WITH DRUG DISPENSING POD

This invention relates generally to arrows for use by archers and more particularly to arrows especially adapted for use by bow hunters in the pursuit of game and including a detachable pod for encapsulating and automatically releasing a tranquilizing composition intended to insure a quick, humane kill.

In the case of bow hunting it is not at all too uncommon for the hunter to direct an arrow into the flesh of the quarry with what amounts to a mortal hit but without the animal actually being brought to the ground at or near the point of impact. This situation may be readily understood when one realizes that an extreme amount of skill is required in order to consistently achieve instant kills. Thus it follows that many of the arrows directed towards moving game and which inflict mortal wounds upon the animal may fail to fell the quarry in the immediate vicinity of the hit with the result that the mortally wounded animal will endure unnecessary suffering and may escape to an inaccessible location during its last moments of life.

During the past few years bow hunting has substantially increased in popularity and all sportsmen participating in this activity seek a clean kill and deplore the unnecessary suffering and possible escape of an otherwise mortally wounded animal.

The present invention proposes a hunting arrow having means insuring a more rapid and humane killing of the game and includes an arrow incorporating, with the arrowhead, means for dispensing a tranquilizer or drug into the flesh of the animal automatically as the arrowhead is embedded into the animal's flesh.

By this arrangement it will be understood that none of the challenge of the hunt is removed but rather a quicker and more humane kill is achieved following the bowhunter's stalking of the quarry and subsequent skillful release of the arrow. Previous attempts at providing hunting arrows of this class have involved an intricate construction requiring modification of the arrow shaft and/or head itself whereas the present arrangement comprises a device which is readily utilized in association with the conventional type of hunting arrow most commonly used.

Accordingly, one of the primary objects of the present invention is to provide a hunting arrow including means for releasing a tranquilizer as the arrowhead becomes embedded within the game to insure a quick, humane kill.

Another object of the present invention is to provide a hunting arrow having tranquilizer dispensing means associated therewith including means for automatically releasing the tranquilizer as the arrowhead passes into the animal's flesh.

Still another object of the present invention is to provide a hunting arrow having means for dispensing a tranquilizer which means may be reused an unlimited number of times by refilling in the field.

A further object of the present invention is to provide a hunting arrow having a conventional broadhead tip and including a tranquilizer dispensing pod which is reusable and readily attached and removed from the broadhead by the archer while in the field.

Another object of the present invention is to provide a pod dispenser adapted to be attached to a broadhead and including a pivotal cover having means for the automatic opening thereof as the broadhead enters the flesh of an animal.

Still another object of the present invention is to provide a pod dispenser for attachment to a broadhead of a hunting arrow and including a spring wire form partially encapsulated by a heat shrinkable plastic member which is automatically ruptured upon entry of the broadhead into the flesh of an animal.

With these and other objects in view which will more readily appear as the nature of the invention is better understood, the invention consists in the novel construction, combination and arrangement of parts hereinafter more fully described, illustrated and claimed.

The preferred and practical embodiments of the invention are shown in the accompanying drawing, in which:

FIG. 1 is a partial side elevation of a hunting arrow according to the present invention.

FIG. 2 is a top plan view of one embodiment of a pod dispenser of the present invention as applied to the rear of a broadhead.

FIG. 3 is a side elevation and illustrates the opposite side of the broadhead as viewed in FIG. 1.

FIG. 4 is an enlarged side view, partly in section, of one form of pod dispenser according to the present invention.

FIG. 5 is a top plan view of the pod dispenser of FIG. 4 with the pivotal cover in the fully opened position.

FIG. 6 is an exploded perspective view of another embodiment of the present invention illustrating the manner of assembling the plastic capsule and spring wire form.

FIG. 7 is a side elevation of the pod dispenser of FIG. 6 and illustrates in full lines the heat shrinkable plastic capsule as it appears when the pod dispenser is ready for use.

FIG. 8 is a side elevation of a broadhead having a pair of pod dispensers according to FIGS. 6 and 7 attached thereto.

Similar reference characters designate corresponding parts throughout the several FIGS. of the drawing.

Referring now to the drawing, particularly FIGS. 1 and 8, the present invention will be seen to comprise a pod dispenser 1 or 20 adapted to be attached to the principal blade 3 of a conventional hunting-type arrowhead or broadhead 4. The arrow, generally designated A, may be of any conventional construction having either a solid or hollow shaft S, and it will be understood that the manner of attaching the broadhead 4 to the shaft S will of course vary according to the type of construction of the arrow shaft. Usually, the broadhead includes a rearwardly projecting tang T which is removably attached to an arrow shaft by any suitable screw-threaded arrangement or may be permanently affixed thereto such as by use of an adhesive.

The well known hunting broadheads 4 include an axial shank 5 and a pair of cutout portions 6—6 extending a substantial length of the shank 5 and bounded at the rear thereof by a forward facing edge 7 of a pair of rear lateral webs 8—8 which serve to join the rear of the cutting edge portions of the primary blade 3 to the shank 5 of the broadhead.

Each of the pod dispensers 1 and 20 of the present invention are adapted to be readily attached and removed from the lateral web 8 of the broadhead 4 and include a construction serving to encapsulate a measured amount of a suitable tranquilizing composition which may most conveniently be either granular or powder in form. The pod dispenser 1 illustrated in FIGS. 1—5 will be seen to comprise a planar base 9 having an upstanding sidewall 10 which together serve to form the lower portion of a pocket or cavity 11. Adapted to overlie the base and sidewall assembly is a cover 12 which is pivotally attached by means of the hinge 13 to the rear of the sidewall 10 of the base 9 and also includes an interior pocket or cavity 11. The forward portion of the cover 12 is provided with a latch 14 which is pivotally attached to the cover by means of a hinge 15 and includes a release arm 16 at one end and a hook 17 at the other end thereof. As will be seen most clearly in FIGS. 2, 4 and 5, the downwardly facing hook 17 is adapted to cooperate with a catch 18 provided in the forward sidewall 10 when the cover 12 is in the closed position as shown in full lines in FIG. 2, in which position it should also be noted the aforedescribed release arm 16 of the latch 14 is in a forwardly projecting position, that is, toward the point of the broadhead 4.

In order to provide a substantially sealed pocket cavity 11 when the cover 12 is in the closed position a resilient seal 19 is attached to the inner surface of the base 9 and engages the lower edge of the cover 12 and at the same time provides a biasing force to the cover when closed to maintain the hook 17 in locked engagement with the catch 18. To enable ready attachment and removal of the pod 1 upon the lateral web 8 of a broadhead, a resilient friction clamp C projects from the bottom of the base 9 to the rear thereof. In this manner the pod is quickly attached to a broadhead by placing the friction clamp C through one of the cutout portions 6 and then moving the pod rearwardly such that the friction clamp straddles the lateral web 8 and the front of the clamp engages the forward facing edge 7 of the lateral web.

In the use of the pod dispenser 1 the hunter may fill the pocket cavity 11 thereof either in advance of taking to the field or even after the pod is attached to the broadhead. It is only necessary to unlock the cover 12 and move it to the open position of FIG. 5 in order to fill the pocket cavity with a measured amount of the tranquilizer composition. The cover is then closed and the hook 17 of latch 14 is engaged with the catch 18 whereupon the pod will remain thus closed until the release arm 16 of the latch is pivotally displaced rearwardly. As mentioned, the resilient nature of the seal 19 assists in maintaining a slight upward force to the closed cover 12 to encourage a positive engagement of the hook 17 beneath the catch 18. When the thus prepared arrow A is let loose and strikes the quarry, movement of the broadhead 4 into the flesh of the animal causes a rearward displacement of the release arm 16 of the latch 14 to disengage the hook 17 from the catch 18 and cause the cover 12 to move rearwardly in the direction as shown in FIG. 2 of the drawing, thereby releasing all of the contents of the pocket cavity 11 for exposure to the flesh tissue of the animal.

After withdrawal of the arrow from the game it will be obvious that if reclaimed, the pod dispenser 1 may be reused. To preclude separation of the pod dispenser from the broadhead during withdrawal of the arrow any additional clamping means or modification of the friction clamp C may be made so that the dispenser will not slide off the lateral web 8 during rearward movement of the broadhead.

In the pod dispenser 20 illustrated in FIGS. 6—8 a simple two-part dispenser is shown which is utilized under the same conditions and for the same purposes as the pod dispenser 1 of FIGS. 1—5. The dispenser 20 comprises a spring wire frame or form generally designated 21 which may be formed from a single length of any suitable type of relatively thin spring wire and includes a lowermost resilient clamp portion 22 which is bent rearwardly at its forward portion to provide a pair of vertically and laterally spaced side wires 23. These side wires 23–23 extend forwardly and terminate in a pair of upwardly directed curved lead wires 24–24. In this embodiment the cover or encapsulating material for the tranquilizing composition comprises a plastic capsule 25 which may be cylindrical in cross section, or any other suitable configuration which provides a pocket or cavity 26 of sufficient dimension to surround the two pairs of vertically spaced side wires 23–23. The cover or capsule 25 includes a front opening 27 and a closed rear wall 28 and if constructed of plastic, is any suitable type of thermoplastic material having a heat shrinkable property for reasons which will become apparent hereinafter.

The pod dispenser 20 is prepared for use by the bow hunter by placing a measured amount of any suitable tranquilizing composition 29 into the pocket cavity 26 of the capsule 25 and then inserting the two pairs of vertically spaced side wires 23–23 into the capsule until the front edge or opening 27 thereof is positioned as shown by the broken lines of FIG. 7. The capsule 25 is then sealed at its front opening 27 by the application of heat such as a lighted match, which causes the forward portion of the capsule to shrink and become fully sealed as shown in the full lines of FIG. 7. When thus formed it will be seen that the pod dispenser 20 is ready for attachment to the lateral web 8 of a broadhead 4 by means of the resilient clamp portion 22 with the two upwardly directed lead wires 24–24 providing a forward projection analogous to the release arm 16 of the pod dispenser 1.

Upon entry of a broadhead equipped with the pod dispenser 20 into an animal's flesh, the lead wires 24, due to their upward inclination, will be forced backwardly with the rear curved portions of each of the side wires 23–23 serving as a pivot point and the thus displaced spring wire form ruptures or tears open the capsule 25 to expose the tranquilizer contents thereof to the animal tissue.

The wire form 21 may quite obviously be arranged in any of other configurations, it being kept in mind that the initial purpose thereof is to provide a supporting frame to insure that the capsule 25 will retain the cavity 26 upon the heat application step while permitting the closure of the front opening 27 due to the juxtaposed relationship of the wire form elements immediately to the rear of the lead wires 24–24. Then, during use the top pair of side wires 23–23 serve as the means to strip back the cover 25 to dispense the contents therein.

The above description relates to a cover or capsule 25 of plastic material. Quite obviously, the present invention may be practiced by utilizing other materials for the encapsulating element 25 such as rubber or paper. The selected material must include adequate sealing means to permit closure thereof when installed upon the wire form 21 and should be readily displaced or opened when used as intended. In the case of a rubber sleeve or cover 25, for example, the inherent resiliency would provide sufficient closure while permitting a ready rearward displacement during use.

When using any form of pod dispenser according to the present invention it will be understood that one or two of the dispensers may be attached to a broadhead such as shown in FIG. 8.

I claim:

1. In an archery arrow including a shaft and an arrowhead, a pod dispenser having means for attachment of the dispenser to said arrowhead, said attachment means fixedly secured to said arrowhead to resist rearward displacement thereof, said dispenser provided with a cover defining a pocket for encapsulating a chemical composition, said pocket laterally extending beyond the attached surface of said arrowhead, and release means engaging said cover and projecting upwardly and forwardly from said dispenser and displaceable rearwardly upon entry of the arrowhead into its target to open said cover.

2. In an archery arrow including a shaft and an arrowhead, a pod dispenser on said arrow for automatically releasing a chemical composition when the arrow enters its target, said dispenser including a cover defining a pocket for encapsulating the composition, means supporting said cover for attachment to said arrow, clamping means on said supporting means for attachment of said pod dispenser to said arrow, said arrowhead including a broadhead having an axial shank and a primary blade, lateral webs at the rear of said blade, said blade provided with cutout portions bounded by said blade, webs and shank, said dispenser attached to said broadhead with said clamping means engaging one of said webs, and release means projecting upwardly and forwardly from said dispenser and displaceable rearwardly upon entry of the arrow into its target to open said cover.

3. In an archery arrow including a shaft and an arrowhead, a pod dispenser on said arrow for automatically releasing a chemical composition when the arrow enters its target, said dispenser including a cover defining a pocket for encapsulating the composition, means supporting said cover for attachment to said arrow, said cover comprising a flexible capsule and said supporting means including a spring wire form, and release means projecting upwardly and forwardly from said dispenser and displaceable rearwardly upon entry of the arrow into its target to open said cover.

4. An arrow according to claim 3, wherein said wire form comprises a continuous-length wire providing a pair of spaced-apart side wire portions disposed within said capsule and said release means comprises the two free ends of said wire.

5. An arrow according to claim 4, wherein said wire includes a clamp portion below said side wire portions.

6. An arrow according to claim 3, wherein said flexible capsule is of a thermoplastic material.

7. In an archery arrow including a shaft and an arrowhead, a pod dispenser on said arrow for automatically releasing a chemical composition when the arrow enters its target, said dispenser including a cover defining a pocket for encapsulating the composition, means supporting said cover for attachment to said arrow, said supporting means including a base and said cover pivotally attached thereto, and release means projecting upwardly and forwardly from said dispenser and displaceable rearwardly upon entry of the arrow into its target to open said cover.

8. An arrow according to claim 7, wherein said base is provided with a seal engageable by said cover.

9. An arrow according to claim 7, wherein said release means includes a latch pivotally connected to said cover, a catch on said base, and a hook on said latch engaging said catch when said cover is closed.

10. An arrow according to claim 9, wherein said release means includes an arm on said latch.